United States Patent
Monserratt et al.

(10) Patent No.: US 7,025,550 B2
(45) Date of Patent: Apr. 11, 2006

(54) PULL TYPE SWAGE FASTENERS WITH REMOVABLE MANDREL

(75) Inventors: Ernest Monserratt, Alhambra, CA (US); Lloyd Parker, Jr., Corona, CA (US)

(73) Assignee: Huck International, Inc., Tucson, AZ (US)

( * ) Notice: Subject to any disclaimer, the term of this patent is extended or adjusted under 35 U.S.C. 154(b) by 0 days.

(21) Appl. No.: 10/215,630

(22) Filed: Aug. 8, 2002

(65) Prior Publication Data

US 2004/0028500 A1    Feb. 12, 2004

(51) Int. Cl.
    *F16B 19/05*    (2006.01)
(52) U.S. Cl. .................. 411/361; 411/307; 411/308; 411/916
(58) Field of Classification Search ........... 411/361, 411/43, 69, 70, 360, 916, 307–309, 325; 29/516, 517
    See application file for complete search history.

(56) References Cited

U.S. PATENT DOCUMENTS

| 1,084,850 | A |   | 1/1914  | Ford |
|-----------|---|---|---------|------|
| 2,146,461 | A |   | 2/1939  | Bettington |
| 2,526,910 | A |   | 10/1950 | Smith |
| 2,531,048 | A |   | 11/1950 | Huck |
| 3,215,024 | A |   | 11/1965 | Brilmyer |
| 3,483,788 | A |   | 12/1969 | Keeler |
| 3,915,053 | A |   | 10/1975 | Ruhl |
| 3,962,775 | A |   | 6/1976  | King, Jr. |
| 3,965,792 | A |   | 6/1976  | King, Jr. |
| 4,003,288 | A |   | 1/1977  | Jeal |
| 4,044,591 | A |   | 8/1977  | Powderley |
| 4,053,970 | A |   | 10/1977 | King, Jr. |
| 4,054,045 | A |   | 10/1977 | King, Jr. |
| 4,077,299 | A |   | 3/1978  | King, Jr. |
| 4,164,807 | A |   | 8/1979  | King, Jr. |
| 4,233,879 | A | * | 11/1980 | Sigmund ............... 411/361 |
| 4,263,834 | A |   | 4/1981  | Dudash |
| 4,299,519 | A |   | 11/1981 | Corbett |
| 4,402,203 | A |   | 9/1983  | Molina |
| 4,472,096 | A |   | 9/1984  | Ruhl et al. |
| 4,489,471 | A |   | 12/1984 | Gregory |
| 4,649,732 | A |   | 3/1987  | Molina |
| 4,874,275 | A |   | 10/1989 | Gotman |
| 4,995,777 | A | * | 2/1991  | Warmington ............. 411/361 |
| 5,090,852 | A |   | 2/1992  | Dixon |

(Continued)

FOREIGN PATENT DOCUMENTS

GB            472329        9/1973

(Continued)

*Primary Examiner*—Jack W. Lavinder
(74) *Attorney, Agent, or Firm*—David P. Maivaid, Esq.; Eckert Seamans Cherin & Mellott, LLC

(57) ABSTRACT

A pull type swage fastener including a pin and a collar adapted to be swaged into a locking portion on the pin shank and with a removable mandrel being threadably securable in a pull cavity at the end of the pin shank and with the mandrel adapted to be gripped by an installation tool for applying a relative axial force between the pin and collar to swage the collar into the locking portion with the mandrel being releasable from the tool and removable from the pull cavity.

26 Claims, 8 Drawing Sheets

U.S. PATENT DOCUMENTS

| | | |
|---|---|---|
| 5,098,238 A | 3/1992 | Batchelor et al. |
| 5,315,744 A | 5/1994 | Denham et al. |
| 5,315,755 A | 5/1994 | Fulbright et al. |
| 5,439,339 A | 8/1995 | Batchelor |
| 5,519,926 A | 5/1996 | Rosier |
| 5,548,889 A | 8/1996 | Smith et al. |
| 5,604,968 A | 2/1997 | Fulbright et al. |
| 6,233,802 B1 | 5/2001 | Fulbright |
| 6,325,582 B1 | 12/2001 | Sadri et al. |
| 6,357,110 B1 * | 3/2002 | Shipp et al. ............ 29/825 |
| 6,497,024 B1 * | 12/2002 | Fulbright ............ 29/243.522 |

FOREIGN PATENT DOCUMENTS

| | | |
|---|---|---|
| GB | 2083586 A * | 3/1982 |

* cited by examiner

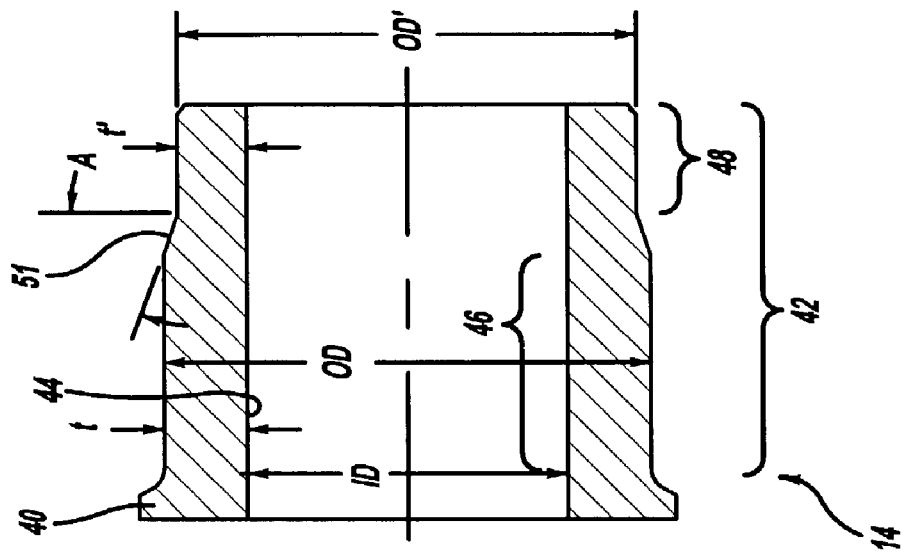
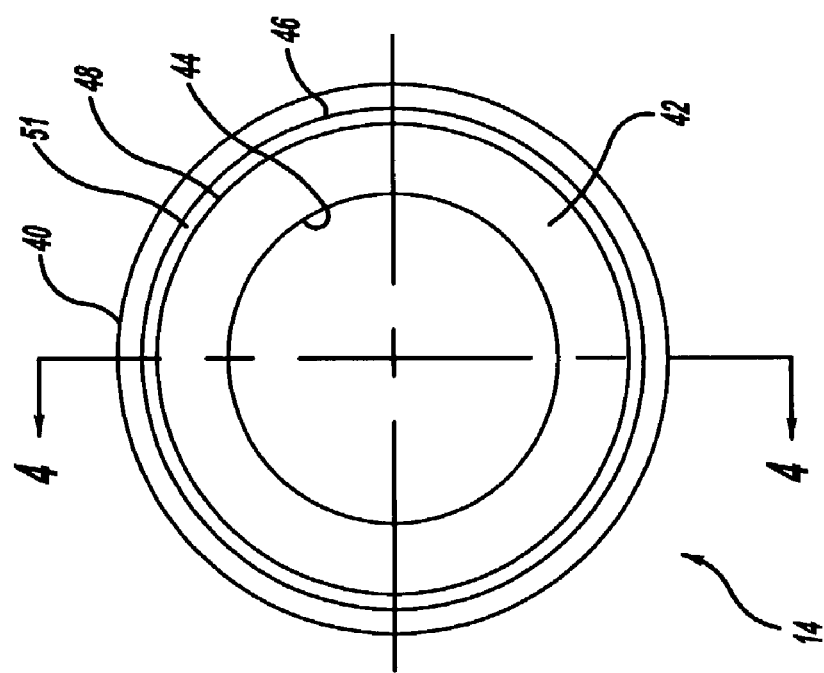
*Figure - 4*
*Figure - 3*

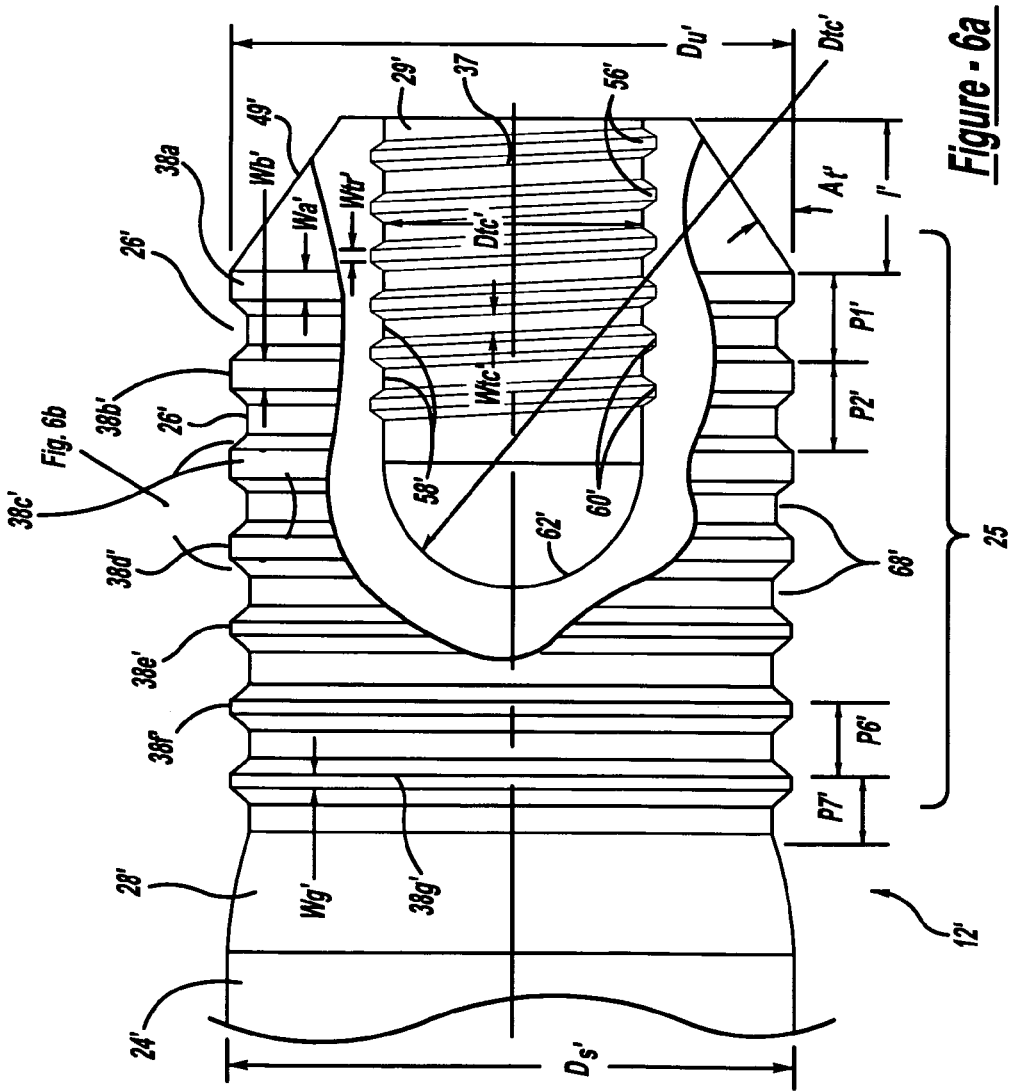

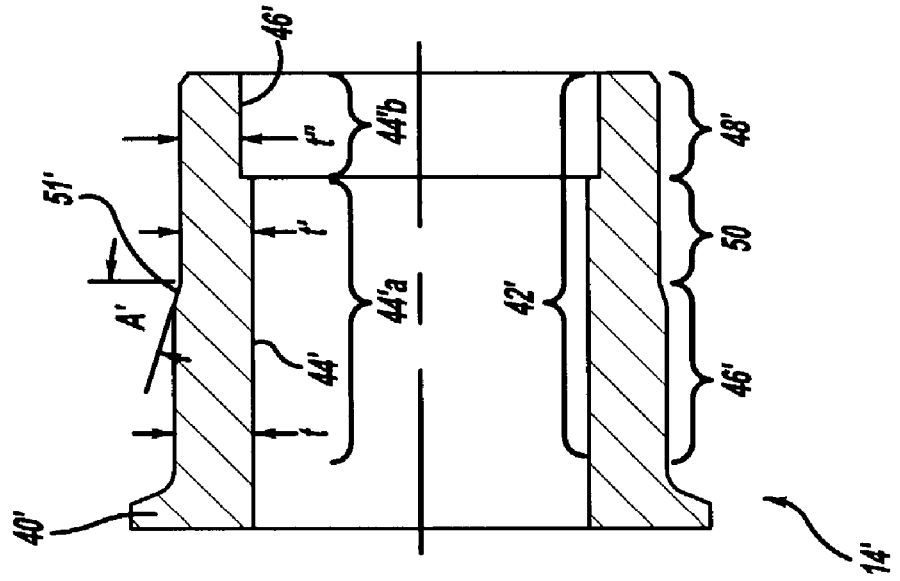
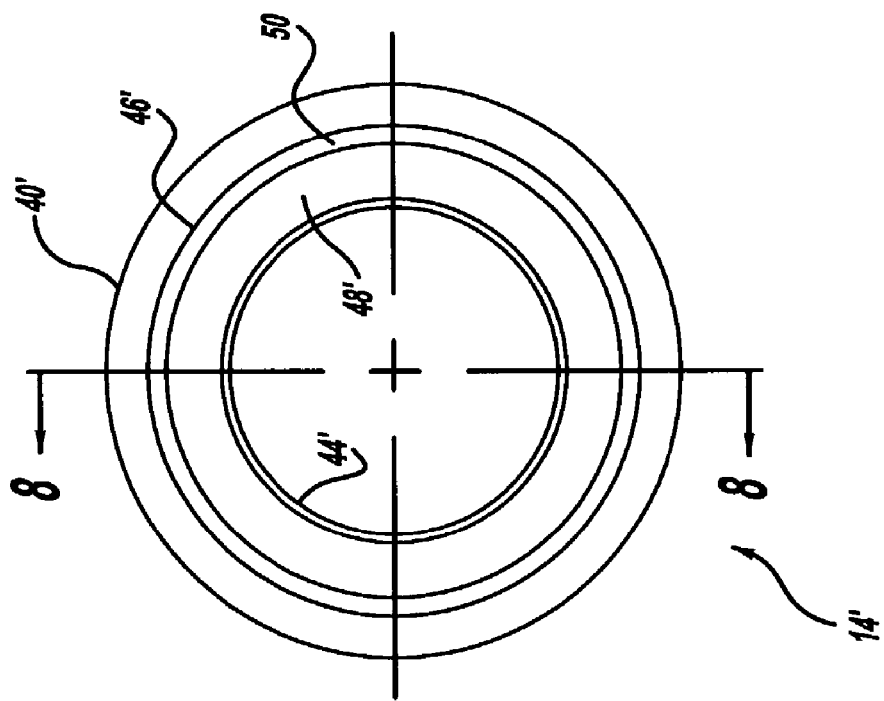
*Figure - 8*
*Figure - 7*

PULL TYPE SWAGE FASTENERS WITH REMOVABLE MANDREL

FIELD OF THE INVENTION

The present invention relates to pull type swage fasteners in which a collar is swaged into lock grooves on a pin in response to a relative axial force between the pin and collar.

BACKGROUND OF THE INVENTION

The present invention relates to a fastening system for pull type swage fasteners including a pin and a collar with the collar adapted to be swaged into the pin with a mandrel removably secured in the shank of the pin and adapted to be gripped by an installation tool for applying the required relative axial pulling force between the pin and collar for swaging the collar.

The present invention relates to two-piece swage type fasteners or lockbolts generally of the type illustrated in U.S. Pat. No. 2,531,048 to L. Huck, issued Nov. 21, 1950, and U.S. Pat. No. 3,215,024 to Brilmyer et al issued Nov. 2, 1965; there are numerous other variations of swage type fasteners such as U.S. Pat. No. 3,915,053 to J. Ruhl, issued Oct. 28, 1975, U.S. Pat. No. 4,472,096 to J. Ruhl and R. Dixon, issued on Sep. 18, 1984 and U.S. Pat. No. 5,090,852 to R. Dixon, issued Feb. 25, 1992.

A typical swage type fastener includes a pin and a collar with the pin shank having a locking portion with lock grooves and, with the pull type, the pin shank terminating with a pull portion with pull grooves. The pull grooves are adapted to be gripped by matching teeth in chuck jaws of an installation tool having a swage anvil adapted to engage the collar whereby a relative axial force can be applied between the pin and collar to secure workpieces together under a preselected clamp force. As the relative axial force increases to provide the desired clamp force the installation is completed as a magnitude of relative axial force is attained to move the anvil over the collar to swage it into the lock grooves. Here the relative axial force is a tensile load on the pin via the chuck jaws and a compressive load on the collar via the tool swage anvil.

In pull type swage fasteners the pull portion typically is connected to the lock groove portion by a breakneck groove of reduced strength which is adapted to fracture at a preselected magnitude of axial or tensile force greater than that required to swage the collar whereby the pull portion, or pintail, will be severed from the pin shank and discarded after completion of swaging. See the patents cited above.

In addition with fasteners including pins having the pull grooves on a severable pintail the breakneck groove must also be of sufficient strength to withstand the high tensile load for swaging and the pull grooves must be similarly of sufficient strength to accept the relative axial pull load applied by the engaged teeth of chuck jaws on the installation tool. This routinely requires that the pull portion be of a relatively large diameter so as to have sufficient material to provide the necessary size and strength for the breakneck groove and also to inhibit fracturing of the pull grooves instead of the breakneck groove. In aerospace applications, the fasteners are most frequently made of a lightweight, high strength material which can be somewhat costly. Thus the severable pintail adds to the overall cost of each fastener. Certain systems have been developed for pull type swage type fasteners in which the pin is gripped externally and/or internally by a threaded member of the installation tool. Such systems are shown in U.S. Pat. No. 5,315,755 to Fulbright et al issued May 31, 1994 and U.S. Pat. No. 6,233,802 to Fulbright issued May 22, 2001.

SUMMARY OF THE INVENTION

In the present invention a removable and reusable mandrel is provided to be threadably secured in a pull cavity at the end of the pin shank and be gripped by the installation tool for applying the relative axial pulling force for swage. At the end of swaging the mandrel can be threadably removed from the pull cavity and reused thus reducing the overall cost of the fastener. In addition there will be no debris such as caused by the severable pintail after fracture.

There also are applications in which the fastener is to be installed into workpiece openings with an interference fit. Depending upon the overall thickness of the workpieces this could also require a severable pintail of somewhat greater length to facilitate initial gripping by the installation tool to draw the pin into the openings. Here the removable and reusable mandrel can be made of a length to accommodate such applications with minimal extra cost to the user.

With swage type fasteners, the collar is radially compressed into lock grooves in the pin shank. This poses no problem with the routine construction with the severable pintail. However, with the use of a removable mandrel the outer end of the pin shank with the lock grooves is formed with a threaded pull cavity into which a threaded portion of the mandrel is secured. This portion of the pin shank will have less resistance to compressive loading as the collar is swaged therein and could result in distortion and/or jamming of the threaded portion of the mandrel in the threaded pull cavity. An option would be to simply make that part of the pin shank longer such that the threaded bore would be substantially past the collar and substantially not in line with the portion of the collar being swaged. This, however, would leave the installed fastener somewhat heavier than the comparable fastener with the severable pintail and would also add some cost to the pin.

In the present invention a unique combination is provided in which the lock groove portion of the pin shank for use with the removable mandrel is of substantially the same length as that for the pin shank with the severable pintail. In the present invention, however, the lock groove portion is provided with a unique configuration to permit swaging of the collar at lower swage loads and at the same time to enhance resistance to compressive loading at the outer end of the pin shank and hence to prevent distortion of the threaded pull cavity during collar swage. In addition the collar is also constructed to assist in the reduction in swage load. This is balanced with a threaded pull cavity formed to maximize the strength of the pull portion of the mandrel and the threads of the pull cavity while enhancing resistance to compressive loading. At the same time, in one form of the present invention unique collar constructions are provided in which the outer portion of the collar shank is constructed to be effectively swaged at a reduced load and with less compressive force on the pin shank specifically in the area of the pull cavity. In addition the remainder of the collar shank is also constructed in combination with the lock grooves to be swaged at a reduced load. These features are provided, however, with substantially no reduction in the overall strength of the swaged fastener relative to the counterpart with the severable pintail. In addition, the construction is optimized such that the size and weight of the installed fastener is substantially the same as the existing form with a severable pintail. Examples of low swage load type fasteners of different constructions are shown in U.S. Pat. No. 6,325,582 to Sadri et al, issued Dec. 4, 2001 and the '802 patent cited above.

It should be noted that aerospace fasteners are used to secure metallic workpieces and also workpieces made of a lightweight composite material. With composite material applications certain elements of the fastener are specifically designed to provide substantial distribution of the applied loads to avoid localized delamination of the material.

It should also be noted that with the pull type fastener in which the pin has a severable pintail, upon fracture of the breakneck groove there will routinely be a certain amount of noise created and some shock load to the operator and structure being secured. This can be significant with workpieces of composite materials where delamination can occur from excessive shock loads. These are totally absent from the fastener of the present invention with the removable pintail.

It is common in aerospace applications to utilize the swage type fasteners for various types of load applications on the joints secured by the swage type fasteners. In these cases a pin of a uniform diameter may be used. However, depending on the type of load application, collars of different materials with different strength characteristics may be used. Such applications may use collars of high strength materials such as titanium or alloy steel and also collars of lower strength materials such as aluminum with pins of same diameter having different lock grooves for the different collar materials. The present invention provides a unique pin design whereby a pin of a common construction can be used for different applications with collars of materials of different strengths. In this regard, the construction of the pin lock groove portion can be partially optimized for a collar of one material while adapted for use in the various load applications and also for use with collars of different materials as noted.

Therefore, it is an object of the present invention to provide a pull type swage fastener having a removable and reusable mandrel adapted to be gripped for pulling.

It is another object of the present invention to provide a pull type swage fastener having a removable mandrel threadably secured in a threaded pull cavity at the end of the pin shank substantially in line with the pin lock groove portion into which the collar will be swaged and of a unique construction to reduce the swage load and hence the magnitude of compressive stress during swage.

It is still another object to provide a pull type swage fastener including a pin and a collar and utilizing a removable mandrel with a connecting construction between the pin and mandrel and including a low swage type collar and unique lock groove structure whereby the overall size, weight and strength of the installed fastener will be comparable to the type with severable pintail.

It is another object of the present invention to provide a pull type swage fastener including a pin and a collar and utilizing a removable mandrel with a connecting construction between the pin and the mandrel and with the pin having a unique lock groove section whereby a pin of a common size and construction can be used with collars of materials of different strengths for different load applications.

It is a general object of the present invention to provide a pull type swage fastener including a pin and a collar and utilizing a removable and reusable mandrel with a connecting construction between the pin and mandrel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1b is an enlarged view of a lock groove of the lock shank portion of the pin of FIGS. 1 and 1a and taken in the Circle 1b in FIG. 1a;

FIG. 3 is an end elevational view of one form of a collar for being swaged into lock grooves on the lock shank portion of the pin of FIG. 1;

FIG. 4 is a longitudinal sectional view of the collar of FIG. 3 taken in the direction of the Arrows 4—4 in FIG. 3;

FIG. 6a is an enlarged view of the lock shank portion similar to the view in FIG. 1a of the pin in FIG. 1 depicting the lock shank portion with the threaded pull cavity for a pin of larger diameter;

FIG. 6b is an enlarged view of a lock groove of the lock shank portion of the pin of FIG. 6a and similar to that of FIG. 1b and taken in the Circle 6b in FIG. 6a;

FIG. 7 is an end elevational view of another form of a collar for being swaged into lock grooves on the pin shank of the pin of FIG. 6;

FIG. 8 is a longitudinal sectional view of the collar of FIG. 7 taken in the direction of the Arrows 8—8 in FIG. 7.

DETAILED DESCRIPTION OF THE PREFERRED EMBODIMENTS

Figure 1:
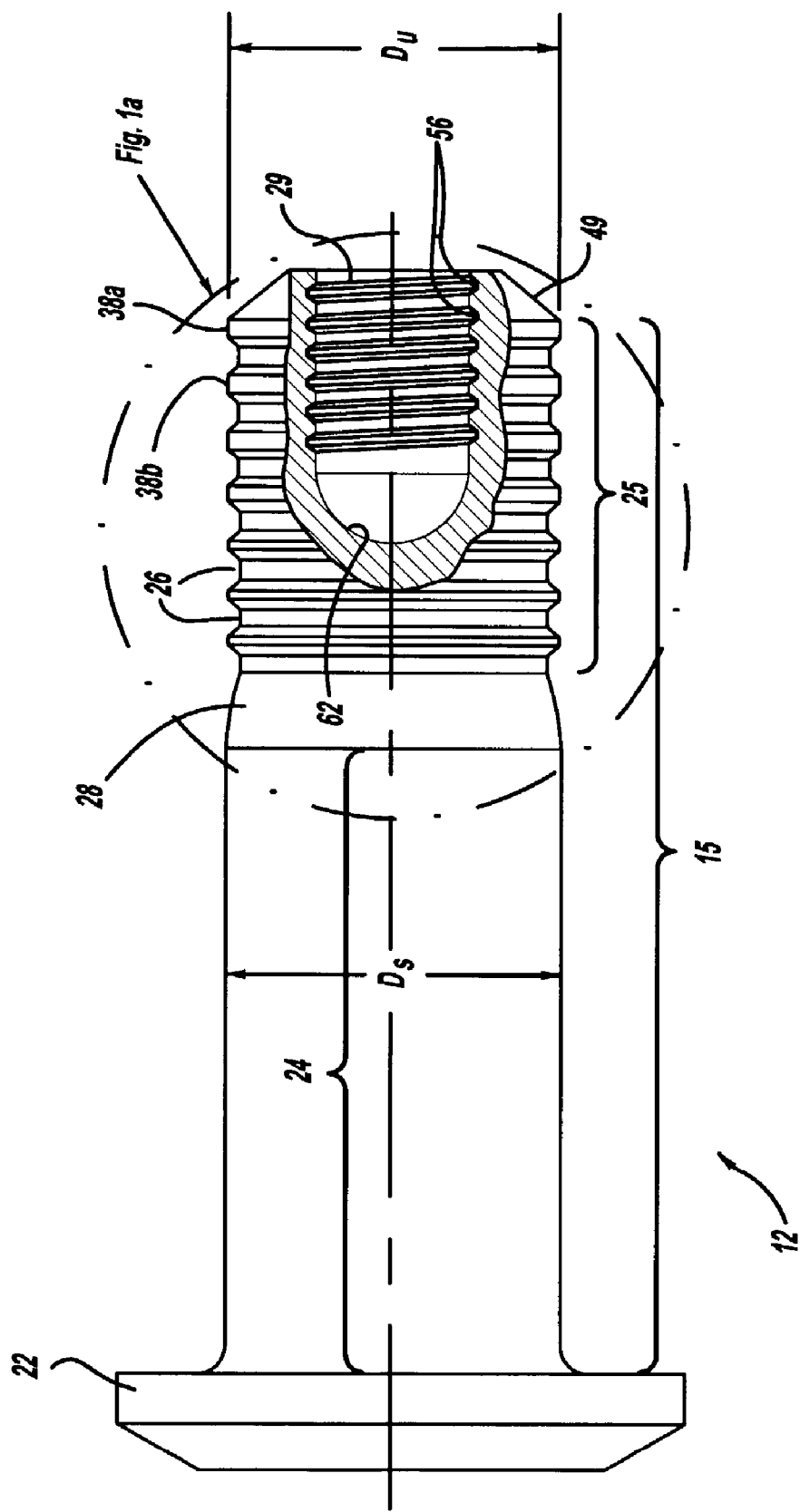
FIG. 1 is a side elevational view of a pin for a pull type swage fastener with a portion of the lock shank portion at the outer end of the pin shank broken away to show a threaded pull cavity.

The following description of the preferred embodiment(s) is merely exemplary in nature and is in no way intended to limit the invention, its application, or uses.

Looking now to FIGS. 1–5, a pull type swage fastener 10 is shown (see FIG. 5) and includes a pin member 12 and tubular collar 14. Pin member 12 has an elongated shank 15 which is adapted to extend through aligned openings or bores 16 and 17 in a pair of workpieces 18 and 20, respectively, to be secured together. See FIGS. 1 and 5. An enlarged protruding head 22 at one end of the shank 15 engages the back side surface 23 of workpiece 18. The pin shank 15 has a straight, smooth cylindrical shank portion 24 adjacent the head 22 which is adapted to be received within the aligned bores 16 and 17. It should be understood that in some installations the bores 16 and 17 can be made of a size relative to the straight shank portion 24 to provide a desired interference fit or a clearance fit. Following the straight shank portion 24 is a lock shank portion 25 having a plurality of circumferentially extending, annular lock grooves 26 separated by crests or shoulders 38. These are shown as crests 38a–38g in the drawings for a reason to be described. An annular arcuately tapered transition portion 28 smoothly connects the lock shank portion 25 with the straight shank portion 24. A threaded pull cavity 29 is located at the outer end of the lock shank portion 25. It should be understood that in all applications the crests or shoulders 38 with lock grooves 26 will be of a crest diameter Du smaller than the diameter Ds of the straight shank portion 24 for clearance with the bores 16 and 17.

Figure 2:
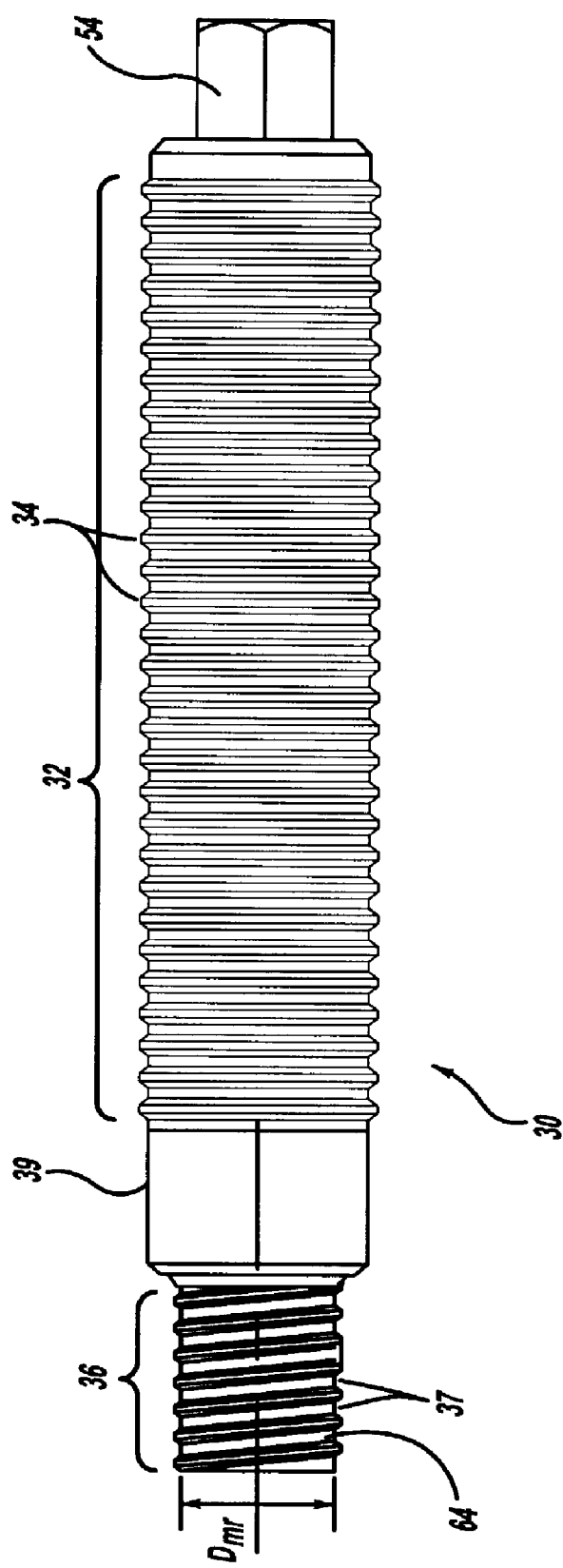
FIG. 2 is a side elevational view of a mandrel adapted to be removably secured to the threaded pull cavity of the pin of FIG. 1.

Looking now to FIG. 2, a removable mandrel 30 includes a pull shank portion 32 having a plurality of annular pull grooves 34. A reduced diameter threaded connecting rod portion 36 is located at one end of the mandrel 30 and is joined to the pull shank portion 32 by a smooth annular land 39. The connecting rod portion 36 has a plurality of helical threads 37 adapted to be threadably engaged with the threaded pull cavity 29 to connect the removable mandrel 30 to the pin shank 15. The pull grooves 34 of the removable mandrel 30 are of a type substantially similar to the conventional pull grooves on a frangible pintail and are adapted to be gripped by an installation tool of a generally conventional construction and which is actuable to set the fastener 10.

Figure 5:
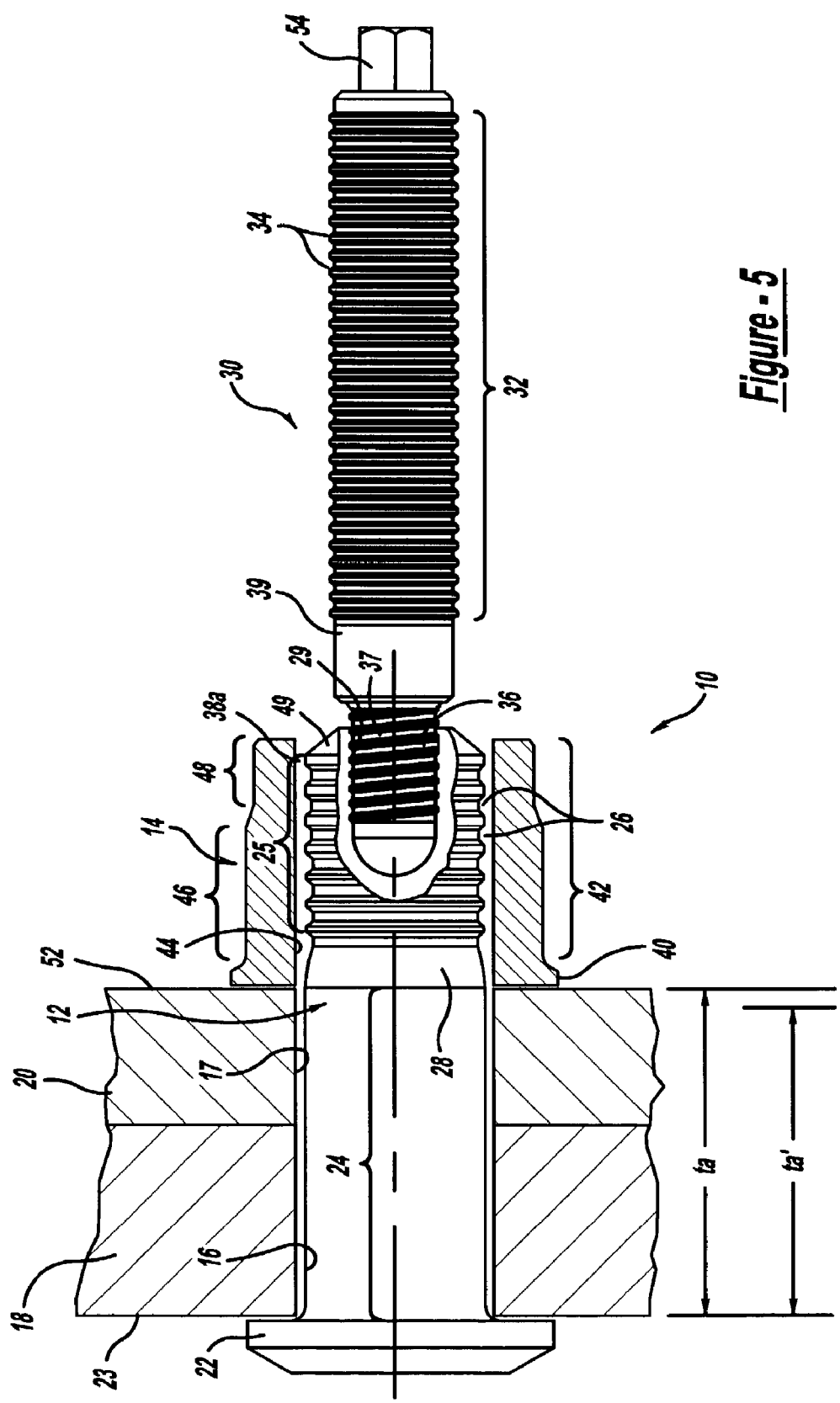
FIG. 5 is a side elevational, assembly view showing the fastener pre-assembled to a pair of workpieces to be secured together prior to installation with the workpieces shown in section with the removable mandrel of FIG. 2 secured to the pin of FIG. 1 and with the collar of FIGS. 3 and 4 shown in section in place on the pin prior to swage.

Looking now to FIGS. 3–5, the collar 14 is a flanged type and includes an enlarged diameter flange 40 with a cylindrical shank 42 and a generally uniform through bore 44 of a diameter ID. The collar shank 42 is of a cylindrical stepped configuration which serves a purpose to be described. An inner shank portion 46 is of an outside diameter OD and a generally uniform wall thickness t. An end shank portion 48 is provided with a radially inwardly stepped outer surface resulting in a reduced wall thickness t' as the outer surface of the collar shank 42 is stepped to a slightly lesser diameter OD'. In this regard the transition at the outer surface in the reduction in diameter OD to OD' is made with a tapered transition section 51 which is inclined at an angle A. The magnitude of inclination A is selected to facilitate movement of the cavity of the swage anvil of the installation tool as it moves from the swaged engagement of the lower thickness end shank portion 48 to the greater thickness inner shank portion 46.

The flanged collar 14 is adapted to be located over the pin shank 15 and, with the workpieces 18, 20 pulled together, will have the collar shank 42 in radial alignment with confronting ones of the lock grooves 26 and crests 38. See FIG. 5. At the same time, the flange 40 will be in engagement with the outer surface 52 of workpiece 20.

Figure 9:
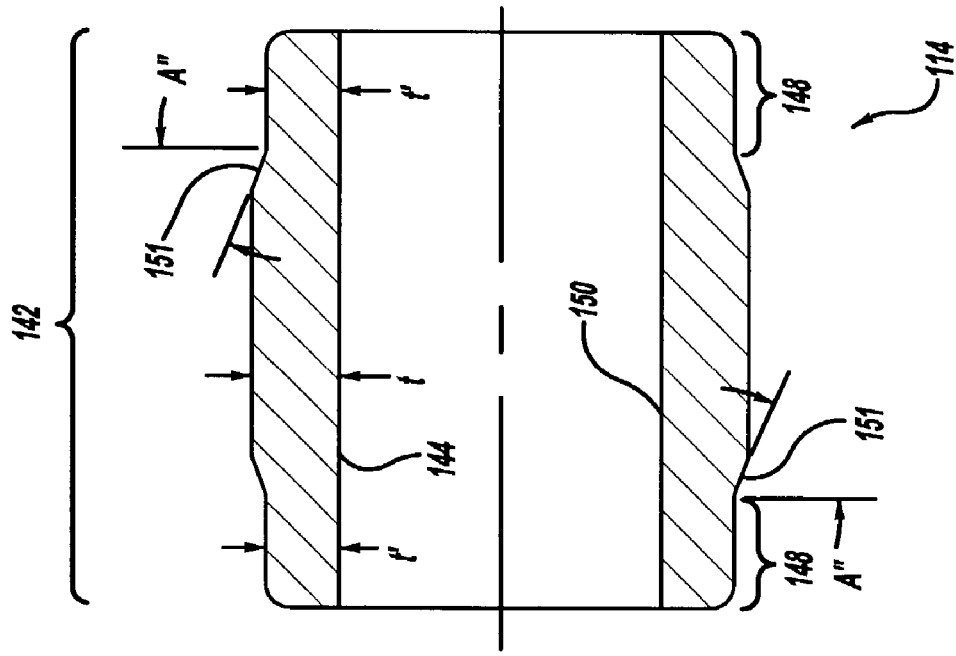
FIG. 9 is a longitudinal sectional view of a double ended collar having a stepped configuration at both ends similar to the stepped configuration of the collar of FIGS. 3 and 4.

As previously noted, it is common for fasteners, such as the fastener 10, to be used to secure workpieces, such as workpieces 18 and 20, which are made of a composite material. Here the area of the collar flange 40 that engages the outer workpiece surface 52 and the area of the pin head 22 engaging the inner workpiece surface 23 are selected to provide a sufficient distribution of the applied loads to avoid delamination of the engaged workpiece surfaces where the workpieces 18 and 20 are made of a composite material. However, the features of the present invention are equally applicable for fastening metallic workpieces with a pin head different than pin head 22 and with variations in the collar such as the use of double ended collars with no flange such as flange 40. Such collars, however, would otherwise be of a construction similar to that as shown in FIGS. 3 and 4 and as shown in FIGS. 7 and 8. One example of a double ended collar is shown in FIG. 9 and will be described hereafter.

Note that workpieces 18 and 20 have a combined thickness ta defining a maximum grip of the fastener 10. The fastener 10, however can be employed over a predetermined grip range which varies from workpieces 18 and 20 having a minimum total thickness ta' to the maximum total thickness ta. Such is generally shown in FIG. 5. Now, to install the fastener 10, the pin member 12 with the removable mandrel 30 attached is inserted into the openings 16 and 17 of the workpieces 18 and 20, respectively. Now the collar 14 is placed over the mandrel 30 and onto the pin shank 15 in line with the lock grooves 26.

In an application where there is an interference fit between the smooth shank portion 24 and the workpiece openings 16 and 17 the pull shank portion 32 of the removable mandrel 30 will be constructed to extend at least partially past the outer workpiece surface 52. The extension of the pull shank portion 32 of the mandrel 30 is thus set to be sufficient to be gripped by an installation tool. The pin shank 15 can then be pulled with the smooth shank portion 24 being moved into the openings 16 and 17 until the pin head 22 engages the back side surface 23 of workpiece 18. The installation tool is then removed and the collar 14 is placed over the mandrel 30 and on to the pin shank 15 in line with the lock grooves 26 of the lock shank portion 25. Now the installation tool can be reapplied to the fastener 10 with the attached removable mandrel 30 gripped by the tool jaws and the relative axial load applied to swage the collar shank 42 into the lock grooves 26. In this regard, it should be noted that interference fit applications are done primarily with workpieces 18, 20 made of metallic materials rather than composite materials. Also in such cases a double ended collar such as the collar of FIG. 9 would most likely be used.

In this regard, in one form of the invention mandrels 30 of different lengths will be made for the different conditions. In the non-interference fit situation, such as in FIG. 5, the mandrel 30 will be made of a minimal length. For interference fit situations mandrels 30 of two longer lengths can be made. One length mandrel 30 would be for use in interference fit conditions where the combined thickness ta of the workpieces 18 and 20 will vary over a substantial range for different applications from a minimum total thickness to a mid-range total thickness. A second mandrel 30 of a longer length will be used for interference fit conditions from a mid-range thickness to a maximum thickness. This will promote the efficiency and convenience of use while providing an overall economic system. It is of course understood, that the above variations are for thickness ranges independent of and greater than the grip range, i.e. ta to ta', of a particular fastener 10. As such the length of the straight shank portion 24 of pin 12 will be varied to accommodate such changes in overall thicknesses.

Upon actuation of the tool, a relative axial force is applied between the pin 12 and collar 14 by the gripping, tensile engagement of the jaws with the pull grooves 34 and the compressive engagement of the swage anvil with the end shank portion 48 at the outer end of the collar shank 42.

Figure 5A:
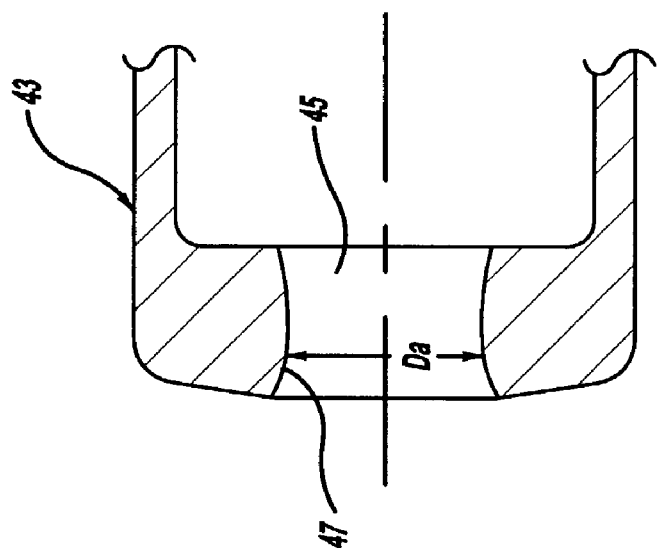
FIG. 5a is a fragmentary sectional view of a swage anvil for swaging the collar into the lock portion of the pin.

Looking now to FIG. 5a, a swage anvil 43 is generally shown and includes a swage cavity 45 having an arcuately formed annular swaging, throat portion 47 which is formed to overengage the collar shank 42 in swage. The throat portion 47 is of a diameter Da which is less than the diameter OD' of the end shank portion 48. The end shank portion 48 along with the arcuate throat portion 47 of the swage cavity 45 provides a predetermined magnitude of resistance or hold-off from the start of swaging or snubbing into the lock grooves 26 whereby the workpieces 18 and 20 will be initially pulled together under a preselected clamp load. The magnitude of hold-off is somewhat less than that of conventional, pull type swage fasteners, but still with the initial hold-off load for closing a gap between workpieces 18 and 20 without snubbing being adequate. As the relative axial force is increased the throat portion 47 of the swage cavity 45 is moved axially to radially compress the end shank portion 48 of reduced thickness t' and then to radially overengage the inner shank portion 46 of thickness t whereby the collar shank 42 is swaged radially inwardly into the lock grooves 26 of pin 12. Upon completion of the swaging and upon further actuation of the tool, a collar ejector member of the tool will be urged axially forwardly to engage the outer end shank portion 48 of the collar shank 42 of the swaged collar 14 and eject it from the swage cavity 45 of the swage anvil 43 thus completing the installation. At the same time the mandrel 30 will be released from a self-ejecting type installation tool. Such tools are well known in the art. An example of a self-ejecting tool can be seen in U.S. Pat. No. 5,519,926 to Rosier issued May 28, 1996. Now the mandrel 30 can be readily removed from the pin 12 by simply unthreading the threaded connecting rod portion 36 from the threaded pull cavity 29. In this regard, the mandrel 30 has a hexagonally shaped gripping section 54 which is located at the opposite end of the pull shank portion 32. This facilitates gripping by a tool if necessary to facilitate unthreading of the rod portion 36 from the pull cavity 29. It should be understood that other irregular contours could be used for the gripping section 54.

Figure 1B:
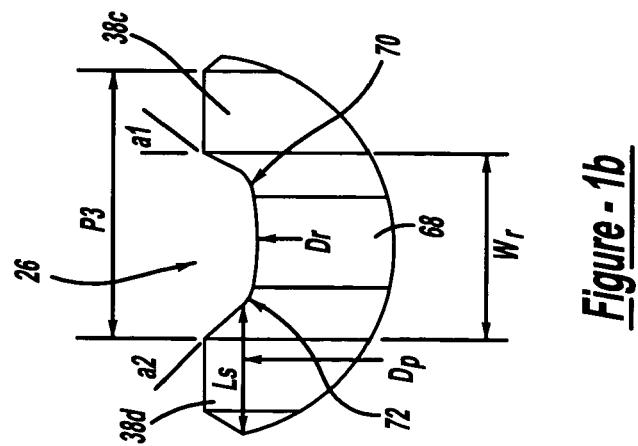
Figure 1A:
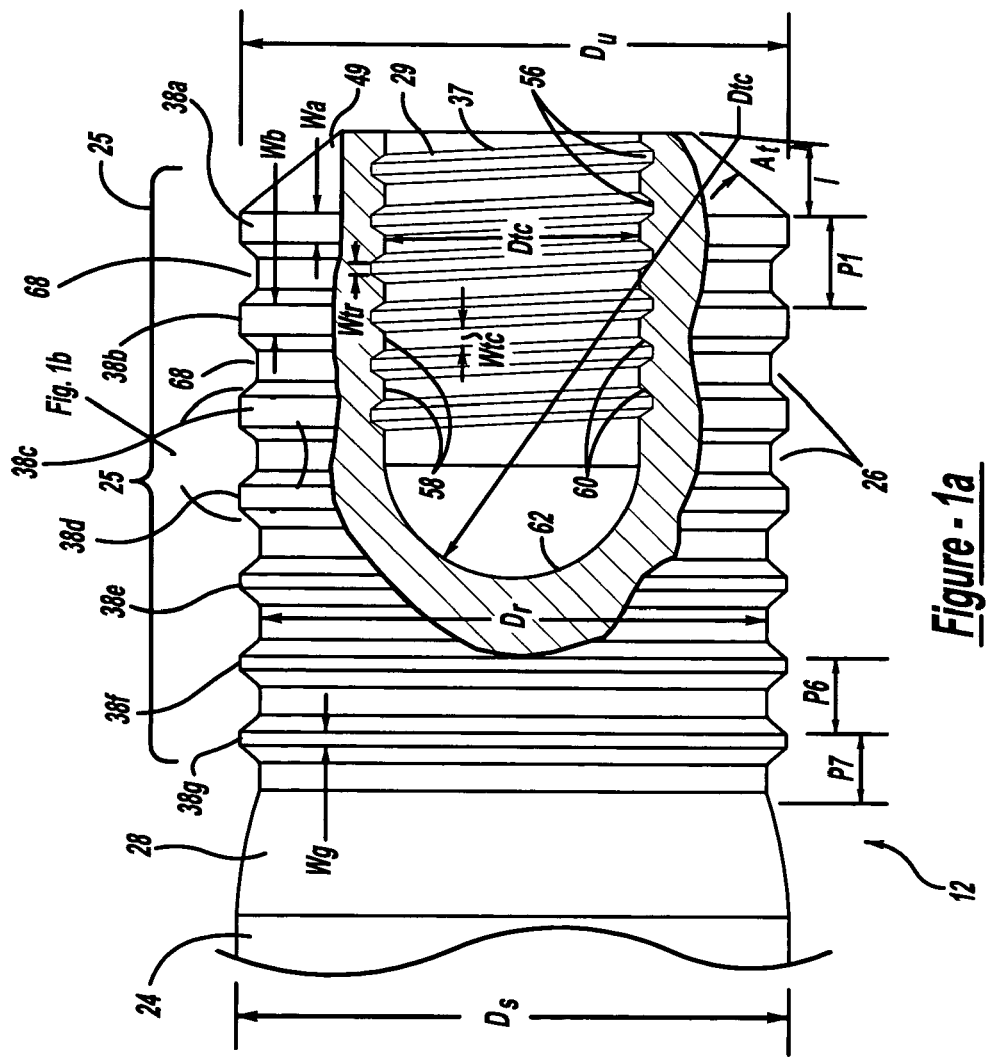
FIG. 1a is an enlarged view of the end of the pin shank of the pin in FIG. 1 taken in the Circle 1a depicting the lock shank portion with the threaded pull cavity.

Looking now to FIG. 1a the pull cavity 29 is provided with a plurality of helical pull threads 56. The helical pull threads 56 are provided with radially inner extending truncated crests 58 and radially outer extending grooves or roots 60. Both the crests 58 and roots 60 terminate in generally flat surfaces with the flat surfaces of the crests 58 having a width Wtc being wider than the width Wtr of the roots 60. This then provides a relatively wider shear area for the crests 58 for engagement by the mating threads of the connecting rod portion 36. At the same time the flat surface at the radially outer end of the roots 60 provides a contour with a limited root diameter to assist in resisting the compressive force from swaging of the collar shank 42. The removable mandrel 30 can be of a high strength ferrous material which is of a higher strength than the pin 12 and thus will require less shear area across the engaging threads 37 than the internal pull threads 56. In addition, the truncation of the crests 58 results in an increase in crest diameter Dtc which permits the diameter Dmr of the roots 64 of the threads of the rod portion 36 of the mandrel 30 to be increased whereby the strength and durability of the rod portion 36 and threads 37 will be enhanced. In one form of the invention the width Wtc at the radially inner end of the crests 58 of the pull threads 56 was approximately 50% longer than the width Wtr of the roots 60 at the radially outer end. This structure provides the cavity 29 with an increase in hoop strength in comparison to threads of a conventional construction where the width of crests and grooves are similar. In addition, the threads 56 are helically formed by cutting after drilling of the cavity. As cut, the radially inner end of the crests 58 are relatively flat with flanks that taper radially inwardly and towards each other. This increases the width of the crests 58 at the base of the roots 60 to maximize shear strength and to reduce stress concentration during swage. In this regard the pull cavity 29 at its innermost end 62 is formed with a generally hemispherically, arcuate contour with the minimum diameter Dtc being substantially equal to the diameter Dtc of the crests 58. This hemispherical, arcuate contour reduces any stress concentration.

Thus the axial depth of the threaded portion of the pull cavity 29 is selected such that the connecting rod portion 36 will be located within the cavity 29 with the threads 56 of the pull cavity 29 being fully engaged by the threads 37 of the rod portion 36. In this regard the threads 37 on the rod portion 36 extend for a slightly greater axial length than the threads 56 in the pull cavity 29. This then will assure full engagement of the cavity threads 56. In this regard, excessive tightening of the threads 37 on the rod portion 36 with the threads 56 in the pull cavity 29 and against the arcuate inner end 62 will not damage the rod portion threads 37 since they are of a substantially higher strength material than the pull cavity 29 and threads 56. At the same time, the end of the annular land 39 will be maintained spaced from the outer end of the tapered portion 49 whereby excessive engagement forces are avoided. The threads 37 on the rod portion also have flat crests and roots.

As indicated, the lock grooves 26 and crests 38 are also constructed in combination with the helical pull threads 56 in the pull cavity 29 to enhance resistance of the pull cavity 29 to compressive loading during collar swaging. In addition they are also constructed in conjunction with the collar 14 to provide low swage loads of the collar shank 42 which results in a reduction in compressive loading on the pull cavity 29. Each of the lock grooves 26 has a root 68. Here the lock grooves 26 with associated crests 38 are formed with varying pitches with the maximum pitch P1 at the first or outermost lock groove 26 decreasing in steps to the minimum pitch P7 at the last or innermost lock groove 26. One of the lock grooves 26 at an intermediate, pitch P3 is shown in FIG. 1b. In this regard each of the lock grooves 26 with roots 68 is of a uniform contour and overall width Wr. Such contour is shown in FIG. 1b. However the widths W of the crests 38 will vary and thus the crests 38 are separately numbered as crests 38a–38g and the widths W are separately designated as Wa–Wg. Thus the width Wa of crest 38a is the maximum width and width Wg of crest 38g is the minimum width which results in the variation in pitch from P1 to P7 as noted. This variation in crest width provides a greater shear strength for the crests 38a and 38b of related lock grooves 26 than the crests 38c–38g of the other lock grooves 26. In this regard the crests 38 have substantially flat radially outer surfaces and the widths W are separately designated as Wa–Wg. The effective shear plane area of the crests 38 will be generally mid-way between the radially outer surface and the root 68 along a line Ls as shown in FIG. 1b. This is generally along the pitch diameter Dp of the lockgrooves 26. The crest widths Wa–Wg, however, are shown at the radially outer surface. In this regard in one form of the invention the width Wa of crest 38a was around twice the width Wg of crest 38g. Here the extra width of crests 38a and 38b will provide greater resistance to the radially compressive force in swage at the outer, open end of the pull cavity 29. This is significant since the compressive strength of the open end of a cavity having a uniform wall thickness will be less than the following inner portion. In addition the fact that the threads 56 in the pull cavity 29 are helical also creates a generally uniform distribution of compressive strength relative to the annular lock grooves 26 and crests 38.

The roots 68 are uniformly formed and are generally arcuate with a triple radius and with a central root diameter Dr. As noted the crests 38 are formed with varying crest widths such as Wa, Wb, etc. However, the roots 68 and crests 38 are uniformly connected with the leading flanks 70 being at an angle a1 which is substantially less than the angle a2 at the trailing flanks 72 whereby the lock grooves 26 are of a uniform geometry. The sharper angle a1 promotes clamp load in response to flow or extrusion of collar material during swage while the shallower angle a2 facilitates forward flow of the collar material during swage. In this regard, as noted, the effective shear plane of the crests 38 will be generally midway into the roots 68 along the line Ls while the effective shear plane on the swaged collar material will be generally along the width Wr of the roots 68 at the crest diameter Du.

In this regard then the tensile load resistance (SLC) of the collar 14 as swaged into the lock grooves 26 and tensile load resistance (SLP) of the pin shoulders or crests 38 for ultimate failure in shear can be determined by the following formula:

(1) Tensile Load Resistance Of Swaged Collar In Lock Grooves 26

$$SLC=(Wr)(\pi Du)Sc$$

Where:
Wr—width of grooves 26, shear plane of swaged collar (FIG. 1b)
Du—diameter of crests 38a–38g (FIG. 1)
Sc is the shear strength in pounds per square inch of the material of the collar 14; and (2) Tensile Load Resistance Of Pin Crests 38

$$SLP=(Ls)(\pi Dp)Sp$$

Where:
Ls—length of pitch line, shear plane of crests 38a–38g (FIG. 1b)
Dp—pitch diameter (FIG. 1b)
Sp is the shear strength in pounds per square inch of the material of the pin 12.

While the tensile load resistance of the swaged collar in lock grooves 26 will be substantially equal for each groove, the tensile load resistance of the pin shoulders or crests 38 will vary with the crest widths Wa–Wg. In this regard, the length Ls will vary for each of the crest widths Wa–Wg.

As noted the pin 12 can be used to secure workpieces, such as workpieces 18 and 20, having a range of total thickness from a maximum grip thickness ta to a minimum grip thickness ta'. As can be seen in FIG. 5 in the maximum thickness condition ta the shank 42 of the collar 14 will extend substantially co-extensively to the outer end of the locking shank portion 25 and thus to the outer end of the pull cavity 29. As indicated for a bore of uniform wall thickness the outer end would have the lowest hoop strength and hence the least resistance to radially compressive forces. In the embodiment of FIG. 1, the hoop strength at the outer end is increased by providing the crest 38a to have the widest width Wa. At the same time the axially outer end of the crest 38a is not provided with a reduced diameter groove type end. Here the outer end surface 49 of the crest 38a is tapered radially inwardly at an angle At from the crest diameter Du to a reduced diameter. Now in the maximum grip condition of total workpiece thickness ta (see FIG. 5), when the outer end of the end shank portion 48 of collar shank 42 is swaged radially inwardly it will be initially only partially over the tapered, inclined end surface 49. Thus there will only be a minimal radial compressive engagement and force on the inclined end surface 49 whereby distortion of the outer end of the cavity 29 will be inhibited. At the same time the reduced wall thickness t' at the outer end of the collar shank portion 48 will also contribute to a reduction in the radial compressive force both at the inclined end surface 49 and the crests 38a and 38b and also partially at crest 38c. This engagement will, of course, vary somewhat over the grip range of the fastener. In this regard the axial length l of the inclined end surface 49 is selected to minimize the extent to which the pull cavity 29 extends into the lock groove portion 25 co-extensively with the lock grooves 26 and crests 38a–38g. At the same time the inclination of the end surface 49 assists in distributing the compressive force applied by the collar end shank portion 48 in swage. However, use of the tapered surface 49 also inhibits distortion while permitting a reduction in weight of the pin 12 in comparison to an extension of the crest width Wa of the crest 38a at the crest diameter Da.

The tapered surface 49 and the first crest 38a of maximum width Wa assist the outer end of the pull cavity 29 in resisting the compressive loads at that end. In this regard, the combined length l of the tapered surface 49 and the width Wa of the first crest 38a extends axially substantially over the first two thread pitches of the pull threads 37 in pull cavity 29. This is approximately over one third of the pull threads 37.

As noted fasteners such as fastener 10 are designed to secure workpieces such as workpieces 18 and 20 which can vary in thickness over a grip range from a minimum thickness ta' to a maximum thickness ta. It is, of course, desirable that the grip range be of a reasonable thickness in order to facilitate an inventory of fewer sizes of the fastener pins 12. Here the same collars 14 are used over the grip range. In the present invention, the pin 12 is designed to be operative over a substantially greater grip range which is approximately double for example a traditional ¹⁄₁₆" grip range. Thus in the maximum grip condition the reduced thickness collar end shank portion 48 will extend somewhat over the inclined end surface 49 of the pin lock shank portion 25 and may not fully fill the last groove 26 adjacent the crest 38g.

However, in the minimum grip condition, the collar end shank portion 48 will be further in and with the collar inner shank portion 46 located further in and less in line with the pull cavity 29. Thus the variation in the width of crests Wa–Wg can be reduced in steps to accept the collar shank 42 in swage over the extended grip range. In this regard the first four crests 38a–38d are provided with greater widths Wa–Wd to assist in resisting the compressive forces on the pull cavity 29. At the same time the stepped reduction in widths from Wa to Wg assists in maintaining the overall length of the lock groove, shank portion 25 at a minimum.

As noted the collar shank 42 is of a stepped construction with the wall thickness being reduced from thickness t at the inner shank portion 46, to a lesser thickness t' at the end shank portion 48. As can be seen in FIG. 5, the collar end shank portion 48 substantially overlays the outer end of the lock shank portion 25 of pin shank 15 and hence over the outer lock grooves 26 and crests 38a and 38b of increased width Wa and Wb, respectively. At the same time the width Wr of the lock grooves 26 and hence volume of each of the lock grooves 26 is equal. Thus the stepped structure of the collar shank 42 with wall thicknesses t and t' is selected to provide a balanced radial compressive force on the lock shank portion 25 in the area of the threaded pull cavity 29 to inhibit distortion of the cavity 29. It can be seen that the noted orientation of the stepped structure of collar shank 42 relative to the lock grooves 26 and crests 38 will be substantially maintained over the grip range of the fastener 10 providing a reduction in swage load.

At the same time, as will be further discussed, there will generally be an adequate fill of the lock grooves 26 since the available volume which is less because of the increase in crest widths Wa and Wb will be partially compensated by the forward extrusion of the swaged collar material of reduced volume with the reduced thickness t' at the end shank portion 48. Thus the stepped construction of the collar shank 42 provides relatively balanced collar packing in the lock grooves 26 in the area of the pull cavity 29 with crests 38*a*–38*e* of widths Wa–We and in the lock grooves 26 past the pull cavity 29 with crests 38*f* and 38*g* of widths Wf and Wg.

It should be noted that pull type swage fasteners are used in numerous applications with different load requirements on the fastened joints. In order to minimize the overall weight of the fasteners being used, fasteners, such as fastener 10, will be provided with pins, such as pin 12, with lock shank portions, such as lock shank portion 25, of various lengths with different numbers of lock grooves, such as lock grooves 26. Thus while the lock shank portion 25 of pin 12 as shown has seven lock grooves 26, it is common to provide pins of the same diameter and generally same contour with between five and eight lock grooves. With each of these structures the outer end of the lock shank portion will be balanced similarly as lock shank portion 25 with the first two lock grooves having the same crest to pitch ratio as crests 38*a* and 38*b* and the last lock groove having the same crest to pitch ratio as the crest 38*g* and with a tapered, inclined end surface such as surface 49. At the same time the width of the last crest, such as the width Wg of crest 38*g*, will be the shortest. The widths of the intermediate crests will then be in different stepped magnitudes and the width Wr of the roots will be the same.

Now with such pins with different numbers of lock grooves 26 and thus different lengths of the locking shank portion 25, the related collar, such as collar 14, will have a shank 42 of different lengths with the inner shank portion 46 being varied in length and with the end shank portion 48 also being varied in length. The depth of the pull cavity, such as cavity 29, will be adjusted for the magnitude of relative axial force required for swage.

In one form of the invention, the truncated helical pull threads 56 in the pull cavity 29 and the mating threads on the connecting rod portion 36 have matching flanks at 30°/30° inclination on both sides.

As noted fasteners, such as fastener 10, will be used for different load applications and as such the collars, such as collar 14, will be provided with materials of different strength to optimize the weight and cost of the overall system. In this regard, while the pins, such as pin 12, will be of a uniform strength material the collars, such as collar 14, can be selected of materials of various strengths such as titanium, alloy steel and aluminum. Here the titanium and alloy steel collar will be of the highest strength and the aluminum collar will be of the lowest strength. In all cases the pin will be of a higher strength material, such as titanium, than the related collar.

In order to optimize the manufacturing cost and simplify the inventory for the end user, the pins, such as pin 12, for a given diameter and given length of lock shank portion 25 will have the lock grooves 26 of uniform construction. Here, however, the width of the roots 68 of the locking grooves 26 will be selected in part to minimize the swage load when the collar 14 is made of the greatest strength material such as titanium. At the same time the width Wg of the last crest 38*g* will be selected to provide sufficient strength to resist crushing in swage when the collar 14 is made of the highest strength material such as titanium. Also the widths Wa–Wd of crests 38*a*–38*d* will be selected to provide sufficient hoop strength in the area of the pull cavity 29 to resist the compressive load when swaging the collar 14 of strongest material such as titanium.

Swage type fasteners have been used for different load conditions applied to the workpieces such as workpieces 18 and 20 and as resisted by the fastener such as fastener 10. These load conditions have been categorized as tension, shear and shear/tension. The tension type condition is essentially a force tending to separate the workpieces 18 and 20 in a direction along the axis of the fastener 10. A shear type condition is essentially a force tending to separate the workpieces 18 and 20 in opposite directions transverse to the axis of the fastener 10. A shear/tension type condition is combination of tension and shear type loading. In each of these cases there is a tensile load component on the fastener 10 and the fastener 10 is designed to fail in shear across the engaged collar and lock groove shoulders. The tensile loads on the tensile application is the highest while the tensile loads on the shear load applications are the lowest with shear/tension in between.

With swage type fasteners it has been conventional to construct pins of higher strength material than that of the collar. As noted this is to avoid damage to the pin from the compressive loads in swaging the collar. Later the groove width was selected to be greater than the crest width with the difference in width selected to accommodate the shear strength of the different materials. Thus even in these cases the fasteners such as fastener 10 are designed to resist the tensile component of the loads and to have a shear strength across the engaged shoulders which is generally around 110% of the anticipated tensile load component. In addition the pin 12 and collar 14 are designed such that the shoulders of the swaged collar 14 would fail first at the 110% tensile load margin with the pin crests or shoulders 38 designed to fail at 110% of tensile failure load of the shoulders on the swaged collar 14.

In prior optimized swage type fasteners each of the grooves and crests where similarly balanced. As noted, however, in the present invention the crests 38*a*–*g* and grooves 26 are designed to provide resistance to compressive load in the area of the pull cavity 29 and low swage loads on the collar shank 42 especially in that area. Thus the grooves 26 are of a uniform width Wr and contour. As such the width Wr for providing low swage is somewhat wider than for conventional swage type fasteners. Thus in the case of the first crest 38*a* its width Wa is also wider than conventional crests to provide resistance for the pull cavity to the compressive forces from swage and also to provide a shear area balanced with the shear area by the larger groove width Wr. This is balanced with regard to the collar 14 made of the highest strength material, such as titanium, which is still of less strength than the pin 12. In one form of the invention the first crest 38*a* was provided with a width to have a shear plane, Ls, such that it would fail in shear at a tensile force around 115% of the tensile load at which the swaged collar shoulders would fail in the adjacent lock groove 26 across the shear plane Wr. As noted, however, the widths Wb to Wg are progressively reduced in size. Thus the last two or three crests 38*e*–38*g* of reduced widths We–Wg would fail at tensile loads equal to or slightly less than that of swaged collar crest in the adjacent lock grooves 26. As noted the last crest 38*g* would fail at a tensile load somewhat less than the swaged crest of the adjacent lock groove 26. However, the overall structure would still provide the pin shoulders or crests 38*a*–38*g* with an overall, combined shear strength whereby the swaged collar shoulders in the uniform lock grooves 26 would still fail in shear before the pin crests 38*a*–38*g*. In this regard, it should be noted that the last crests 38*e*–38*g* while of lesser shear strength than the adjacent collar shoulders in the lock grooves 26 can flex somewhat whereby the tensile load will be partially resisted by the subsequent shoulders 38*a*–38*d*. This, in a sense utilizes the concept of proportioned stiffness in the '053 patent noted above. In addition to the above, it should be noted that in some loading situations, the swaged collar shank 42 adjacent the last pin crests 38*f* and 38*g* may swell or bulb slightly in response to the tensile load whereby more tensile load may be transmitted to the subsequent pin crests 38*a*–38*e*.

In one form of the invention, the pin member 12 is made of a titanium alloy, 6Al-4V, solution treated to a hardness to provide a shear strength of at least around 95 ksi while the removable mandrel 30 is made of an alloy steel VASCO350 heat treated to a hardness of around Rc55–57 and having a shear strength of around 200 ksi. This provides the rod portion 36 of mandrel 30 with strong wear resistance to enhance its continuous use and resistance to damage from excess tightening in pull cavity 29 as noted. At the same time the collar 14 can be made of a titanium alloy, 3Al-2.5V, heat treated to have a shear strength of around 69 ksi.

It had been traditional to provide a volume of collar material around 13% greater than required to fill the lock grooves. This tended to compensate for spring back. But even here the groove would not be completely filled after swage. The '096 patent noted above provided an optimized system utilizing overpacking of around 20%. Subsequently a unique relatively shallow groove configuration was developed as noted above in the '852 patent which also provided an optimized fastener with around 16% overpack. However, in these cases the lock grooves were of uniform construction with different configurations optimized for collars of different materials. With the fastener 10, however, such overpacking, especially in the area of the pull cavity 29 could result in excessive compressive loads on the pull cavity 29. As noted in the present invention while the groove constructions are uniform the crests are varied to accommodate the compressive load applied over the pull cavity 29. At the same time, however, a common groove and crest geometry is provided for each diameter pin to accommodate collars of different materials and hence of different strengths. Even here, however, there is some optimization for the collar 14 of strongest material, which as noted is titanium and alloy steel. There is, however, still applied an overpacking factor which is varied over the length of the lock shank portion 25 to accommodate the variations in the widths Wa–Wg of the crests 38*a*–38*g*.

In one embodiment, the volume of collar shank 42 was selected to provide 'overpacking', i.e., a volume of collar shank 42 to provide substantially more volume of collar material for filling grooves 26 than they could normally accept within the swage envelope defined by the throat portion 47 of the swage cavity 45 of anvil 43 and the confronting portion of lock shank portion 25 including the grooves 26 and crests 38. (See FIG. 5). In the present system in one form of the invention, it has been found desirable to provide a volume of collar material which has an excess of around 1% to around 15% over the length of the lock grooves 26 in a manner to be discussed. The percentage 'overfill' or 'overpacking' noted can be generally determined for a finite length of the effective swage section of swaging throat portion 47 (see FIG. 5) by the relationship:

$$100 \times \frac{[(OD^2 - ID^2) - (Da^2 - Dm^2)]dl}{[Da^2 - Dm^2]dl} = \% \text{ overfill}$$

where:

Da is the diameter of the throat portion 47 of swage anvil 43;

OD is the outside diameter of the inner shank portion 46 of collar 14 before swage;

ID is the inside diameter of the collar 14 before swage;

Dm is the mean diameter of the lock grooves 26 with crests 38; and dl is considered to be a finite length within the throat portion 47 of the swage anvil 43.

It should be understood that in the area of the end shank portion 48 of reduced wall thickness t' the outside diameter OD' will be used in the above determination. In addition, since the crests 38*a*–38*g* vary in widths Wa–Wg while the width Wr of the lock grooves 26 remains constant the mean diameter Dm will be constantly changing. See the CHART OF TYPICAL DIMENSIONS. Thus the magnitude of overpacking will also be varying as noted.

In one form of the invention, the pin 12 and collar 14, of the materials noted, can have typical dimensions as noted in the CHART OF TYPICAL DIMENSIONS.

CHART OF TYPICAL DIMENSIONS

Pin 12 (In Inches)

| Shank 24 | Pull Threads 56 |
|---|---|
| Ds .561 ± .0005 | 5/16 helical, crest 58/root 60 |

Lock Grooves 26

Crest 38, Dia, Du .5521 ± .0015
Root 68 Dia, Dr .5160 ± .0010
Root 68, width Wr .0640
Leading Flank Angle a1 20°
Trailing Flank Angle a2 40°
End Surface 49 Angle A 28°–32°
End Surface 49 Length I .081
Pull Threads 56, crest 48, width Wtc .021 root 60, width Wtr .013

LOCK GROOVES 26

| Crests | Crest Width | Pitch | Crest Width to Pitch % | Crest Width to Root Width % |
|---|---|---|---|---|
| 38a | Wa .0330 | P1 .0970 | 34% | 52% |
| 38b | Wb .0301 | P2 .0941 | 32% | 47% |
| 38c | Wc .0274 | P3 .0914 | 30% | 43% |
| 38d | Wd .0249 | P4 .0889 | 28% | 39% |
| 38e | We .0225 | P5 .0865 | 26% | 35% |
| 38f | Wf. 0181 | P6 .0821 | 22% | 28% |
| 38g | Wg .0160 | P7 .0800 | 20% | 25% |

| Collar 14 (In Inches) | |
|---|---|
| SHANK 42 | |
| Inner Portion 46 | OD .782 ± .001, ID .563 ± .001 t .110 ± .001 |
| End Portion 48 | OD' .776 ± .001, ID' .563 ± .001 t' .107 ± .001 |

In this embodiment, throat portion 47 of the swage cavity 45 was configured in combination with the collar shank 42 to enhance the swaging action at a reduced load with reduced compressive force on the pull cavity 29. Thus the amount of overpack at the outer, open end of the pull cavity 29 in the area of crests 38a–38c was set from around 1% at crest 38a to around 8% at crest 38c while the overpack in the area of crests 38d–38g was from around 9% at crest 38d to around 15% at crest 38g. It can be seen that the initial low magnitude of overpacking in the area of crests 38a–38c is partly a result of the reduced wall thickness t' at the end collar shank portion 48.

It should be noted that the collar shank 42 could be provided with varying thicknesses. Thus while collars made of titanium and alloy steel, of similar strength, may have collar shanks 42 substantially the same the collar shank 42 could be made somewhat thicker for an aluminum collar 14. This would provide greater overpacking and enhance the strength of the swaged collar crests. At the same time with the aluminum being of a lower strength this would not result in excess swage and compressive loads on the pull cavity 29 of a common pin 12.

It should be noted that the above values of materials and dimensions are exemplary only of one form of the invention and that the invention can be applied to fasteners of different materials, sizes and configurations.

For example FIGS. 6a and 6b depict the locking shank portion for a pin of larger diameter than the pin 12. FIGS. 7 and 8 depict a collar for use with the locking shank portion for use with a pin of particular diameter and for a particular load application. Thus except for the structural differences noted in the following discussion the pin and collar of FIGS. 6a–8 can be considered substantially the same as the pin 12 of FIGS. 1, 1a, 1b and 3 and the collar 14 of FIGS. 3 and 4. Thus in the discussions which follow like components and elements in the embodiment of FIGS. 6a, 6b, 7 and 8 are given the same designations as similar components and elements in FIGS. 1, 1a, 1b and 3 and 4 with the addition of a prime and unless described otherwise can be considered to be of substantially the same type of structure.

Thus looking now to FIGS. 6a and 6b, the pin 12' includes a pull cavity 29' which is provided with a plurality of helical pull threads 56'. The helical pull threads 56' are provided with radially inner extending truncated crests 58' and radially outer extending grooves or roots 60'. The pull cavity 29' at its innermost end 62' is formed with a generally hemispherically, arcuate contour with the minimum diameter Dtc' being substantially equal to the diameter Dtc' of the crests 58'. This hemispherical, arcuate contour reduces any stress concentration.

The axial depth of the threaded portion of the pull cavity 29' is selected such that the connecting rod portion, such as rod portion 36, of a removable mandrel, such as mandrel 30, will be located within the cavity 29' fully engaged with the threads 56' of the pull cavity 29'.

The lock grooves 26' and crests 38' are formed with varying pitches with the maximum pitch P1' at the first or outermost lock groove 26' and crest 38' decreasing in steps to the minimum pitch P7' at the last or innermost lock groove 26' and crest 38g'. An intermediate pitch P3' is shown in FIG. 6b. Each of the lock grooves 26' is of a uniform overall width Wr' and uniform contour including the roots 68'. Such contour is shown in FIG. 6b. Thus the widths of the crests 38a'–38g' will vary with the width Wa' of crest 38a' being the maximum width and width Wg' of crest 38g' being the minimum width. This provides a greater shear strength for the crests 38a' and 38b' of lock grooves 26' than the crests 38c'–38g' of the other lock grooves 26'. The extra width of crests 38a' and 38b' provides greater resistance to the radially compressive force in swage at the outer, open end of the pull cavity 29'.

The roots 68' are uniformly formed and are generally arcuate with a multiple radius and root diameter Dr'. The crests or shoulders 38' are formed with varying crest widths such as Wa', Wb', etc. However, the roots 68' and crests 38' are uniformly connected with the leading flanks 70' being at an angle a1' which is substantially less than the angle a2' at the trailing flanks 72'.

The hoop strength of the pull cavity 29' is increased by providing the crest 38a' to have the widest width Wa'. At the same time the axially outer end of the crest 38a' is not provided with a reduced diameter groove type end or extension of the crest 38a'. The outer end surface 49' of the crest 38a' is tapered radially inwardly at an angle At' from the diameter Du' to a reduced diameter. Now in the maximum grip condition when the outer end shank portion 48' of collar shank 42' is swaged radially inwardly it will be initially only partially over the tapered, inclined end surface 49' with minimal radial compressive force whereby distortion of the outer end of the cavity 29' will be inhibited.

The collar 14' has a collar shank 42' of a modified stepped construction from collar shank 42 of collar 14. Thus the collar shank 42' has a multiple stepped construction with the wall thickness being reduced from thickness t at the inner shank portion 46', to a lesser thickness t' at a mid portion 50 to a minimum thickness t" at the end shank portion 48'. Here the collar 14' has a through bore 44' with first bore portion 44'a at the inner end which extends along the inner shank portion 46' and mid portion 50. A second bore portion 44'b of larger diameter extends along the end shank portion 48'. The collar shank 42' is provided with a radially inwardly stepped outer surface resulting in the reduced wall thickness t' at the mid portion 50. In this regard the transition at the outer surface in the reduction in diameter is made with a tapered transition section 51' which is inclined at an angle A'. Again, the magnitude of inclination A' is selected to facilitate movement of the throat portion such as throat portion 47 of the cavity 45 of the swage anvil 43 of the installation tool as it moves from the swage engagement of the end shank portion 48' and mid portion 50 to the inner shank portion 46'. Of course, the swage anvil 43 would be modified to accommodate the larger diameter pin 12' and collar 14'.

The end shank portion 48' and mid shank portion 50 substantially overlay the outer end of the lock shank portion 25' in the area of the cavity 29' and hence over the outer lock grooves 26' which have crests 38a' and 38b' of increased width Wa' and Wb', respectively. As noted the width Wr' of each of the lock grooves 26' and hence volume of the lock grooves 26' is equal. Thus the stepped structure of the collar shank 42' with wall thicknesses t, t' and t" is selected to provide a balanced radial compressive force on the lock shank portion 25' in the area of the threaded pull cavity 29' to inhibit distortion of the cavity 29'. The noted orientation of the stepped structure of collar shank 42' relative to the lock grooves 26' will be maintained over the grip range of the fastener.

The stepped construction of the collar shank 42' provides adequate collar packing in the lock grooves 26' in the area of the pull cavity 29' and in lock grooves 26' past the pull cavity 29' with the low swage load.

Also as previously noted while the lock shank portion 25' as shown has seven lock grooves 26', it is common to provide pins of the same diameter and generally same contour with between five and eight lock grooves. With each of these structures the outer end of the lock shank portion will be balanced similarly as lock shank portion 25' with the first two crests having the same crest to pitch ratio as crests 38a' and 38b' and with the last crest having the same crest to pitch ratio as 38g' and with an inclined end surface such as surface 49'. At the same time the width of the last crest such as the width Wg' of crest 38g' will be the shortest. The widths of the intermediate crests will then be in different stepped magnitudes.

Now with such pins with different lengths of the lock shank portion 25' and different numbers of lock grooves 26' the related collar, such as collar 14', will have a shank 42' of different lengths with the inner shank portion 46', the end shank portion 48' and mid shank portion 50 being varied in length.

As noted before, here again the width of the roots 68' of the locking grooves 26' will be selected in part to minimize the swage load when the collar 14' is made of the highest strength material such as titanium. At the same time the width Wg' of the last crest 38g' will be selected to provide sufficient strength to resist crushing in swage when the collar 14' is made of the highest strength material such as titanium. Thus this structure is optimized for low swage and to provide simplification and reduced manufacturing costs and simplified inventory retention while still providing some optimization for performance over a range of load applications with collars 14' of different materials.

In this embodiment of the invention, the pin 12' and collar 14', of the materials noted, can have typical dimensions as noted in the CHART OF TYPICAL DIMENSIONS.

---

CHART OF TYPICAL DIMENSIONS

Pin 12' (In Inches)

| Shank 24' | Pull Threads 56' |
|---|---|
| Ds' .623 ± .0005 | 5/16 helical, crest 58'/root 60' |

Lock Grooves 26'

Crests 38', Dia, Du' .6150 ± .0015
Root 68' Dia, Dr' .575
Root 68', width Wr' .0665
Leading Flank Angle a1' 20°
Trailing Flank Angle a2' 40°
End Surface 49' Angle A' 23° ± 27°
End Surface 49' Length l' .221
Pull Threads 56', crest 48', Width Wcr' .023 root 60', width Wr' .015

---

LOCK GROOVES 26'

| Crests | Crest Width | Pitch | Crest Width to Pitch % | Crest Width to Root Width % |
|---|---|---|---|---|
| 38a' | Wa' .0343 | P1' .1008 | 34% | 52% |
| 38b' | Wb' .0313 | P2' .0978 | 32% | 47% |
| 38c' | Wc' .0285 | P3' .0950 | 30% | 43% |
| 38d' | Wd' .0259 | P4' .0924 | 28% | 39% |
| 38e' | We' .0210 | P5' .0875 | 24% | 32% |
| 38f' | Wf' .0188 | P6' .0853 | 22% | 28% |
| 38g' | Wg' .0166 | P7' .0831 | 20% | 25% |

Collar 14' (In Inches) SHANK 42'

| | |
|---|---|
| Inner Portion 46' | OD .873 ± .001, ID .625 ± .001 t .124 ± .001 |
| Mid Portion 50 | OD' .863 ± .001, ID .625 ± .001 t' −.119 ± .001 |
| End Portion 48' | OD' .863 ± .001, ID' .640 ± .001 t" − .112 ± 001 |

---

It can be seen here that the axial length l' of the inclined end surface 49' for pin 12' is of a substantially longer relative length than the length l of the inclined end surface 49 for pin 12. In addition the inclination angle At' of end surface 49' is considerably less than the angle At of end surface 49 and thus will generally be different for each diameter pin. The inclination angle At' accommodates the increase in length l' to provide the extra length to locate the pull cavity 29' at the desired position relative to the lock grooves 26'. It can be seen from FIGS. 1a and 6a that the pull cavity 29 extends into the crest 38e while the pull cavity 29' extends to a point midway between crest 38d' and crest 38e'.

Also like the pin 12 of fastener 10, the tapered surface 49' and the first crest 38a' of maximum width Wa' assist the outer end of the pull cavity 29' in resisting the compressive loads at that end. In this case, the combined length l' of the tapered surface 49' and the width Wa' of the first crest 38a' extend axially substantially over the first four thread pitches of the pull threads 37' in pull cavity 29'. This is approximately two thirds of the pull threads 37'.

Also the end shank portion 48' of collar shank 42' is provided with a double reduction in thickness to minimum thickness t". Here the end shank portion 48' of reduced thickness t" will also overengage the crest 38a' with the mid shank portion 50 of a single reduced thickness t' overengaging crests 38b' and 38c' and also crest 38d'. The above features are provided to accommodate the higher swage loads for the larger diameter pin 12'. Such variations, of course, could be made for different size and load applications.

In this regard the magnitude of overpacking noted for fasteners 10 with pin 12 and collar 14 will be similar for pin 12' and collar 14'. Again the overpack at the outer end of the pull cavity 29' in the area of crests 38a'–38c' would be from around 1% to around 8% while the overpack in the area of the crests 38d'–38g' would be from around 9% to around 15%.

In addition the pin 12' can be used with a removable mandrel such as mandrel 30 but as modified to fit the larger diameter pin 12'.

As previously noted a double ended collar will be used in some applications such as with metallic workpieces and an example is shown in FIG. 9. Thus in the discussions which follow, like components and elements in the collar embodiment of FIG. 9 are given the same numeral designations as similar components and elements in FIGS. 4 and 8 with the addition of 100 and unless described otherwise can be considered to be of substantially the same type of structure.

Looking now to FIG. 9 the collar 114 has a symmetrical collar shank 142 of a stepped construction with the wall thickness being reduced from thickness t at the mid portion 150 to a minimum thickness t' at each end shank portion 148. Here the collar 114 has a through bore 144 of uniform diameter. Thus either end shank portion 148 and the mid shank portion 150 will substantially overlay the outer end of the lock shank portion of the pin such as lock shank portion 25, 25'. Thus the stepped structure of the collar shank 142 with wall thicknesses t and t' is selected to provide a balanced radial compressive force on the lock shank portion such as portions 25, 25' in the area of the threaded pull cavity 29, 29' to inhibit distortion of the cavity 29, 29'. The noted orientation of the stepped structure of collar shank 142 and end shank portion 148 relative to the lock grooves such as grooves 26, 26' with crests such as crests 38a–38c with crest widths Wa–Wc and crests 38a'–38c' with crest widths Wa'–Wc' will be maintained over the grip range of the fastener. Here also the end shank portions 148 are connected to the mid portion 150 by tapered transition sections 151 which are inclined at an angle A". Again the magnitude of the inclination A" is selected to facilitate movement of the throat portion, such as throat portion 47, of the swage cavity, such as cavity 45, for swaging the collar 114 into the lock grooves. The double ended collar 114 without a flange such as flanges 40, 40' would be most suitable for securing workpieces in which the one engaged by the collar 114 would be of a metallic type structure and not of a composite material and can be applied to the lock shank portion 25, 25' from either end.

Thus it can be seen the basic concept of the present invention can be applied with modifications to the lock shank portion 25, 25' and to the collar shank 42, 42' as noted.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In a fastening system including a two piece fastener for securing a plurality of workpieces together and an installation tool for installing the fastener and with the fastener including a pin member and a tubular collar and with said collar having a generally straight collar shank adapted to be swaged into lock grooves on said pin member in response to a relative axial force or swage load applied between said pin member and said collar by said installation tool and providing a desired magnitude of clamp load on the workpieces in response to a predetermined magnitude of swage load, said pin member having an elongated pin shank adapted to be located in aligned openings in the workpieces and terminating at one end in an enlarged head adapted to engage a surface on one side of the workpieces and at its opposite end in a grooved portion adapted to extend past an opposite surface on the opposite side of the workpieces, said grooved portion comprising a locking portion having a plurality of said lock grooves defined by circumferentially extending pin grooves and associated pin shoulders terminating in pin crests, said pin grooves having an effective width Wr relative to the effective width W of the crests with the pitch of the crests and grooves varying from the longest at the first crest and groove at the outer end of said pin shank to the shortest at the last crest and groove, each of said pin grooves having an elongated root with a generally smooth contour, said collar shank adapted to be swaged into said lock grooves whereby the workpieces are fastened together to define the fastened joint, said collar when swaged having collar grooves and shoulders interlocking said pin grooves and shoulders, said pin shank having a treaded pull cavity at its outer end, said installation tool having an anvil member with a swage cavity having an effective throat swage portion adapted to overengage said collar shank to thereby swage it radially inwardly into said lock grooves and being operatively connected to a mandrel having a threaded connecting rod portion adapted to be threadably engaged with the threads of said pull cavity whereby the relative axial force can be applied between said pin and said collar by said anvil member and said mandrel to swage said collar shank into said lock grooves, said connecting rod portion being threadably disengageable from said pull cavity for removal from said pin shank upon completion of swage, the width Wr of said pin grooves being substantially uniform over said locking portion with the width W of said crests varying with the longest width W being at the outer end of said pin shank and with subsequent widths W being shorter in preselected steps, the width W of said crests in radial alignment with said pull cavity being selected to provide sufficient strength to said pin shank in the area of said pull cavity to substantially prevent collapse of said pin shank at said pull cavity from the compressive load caused by said collar shank in swage, said collar shank having a predetermined volume of material which is generally greater than the available volume defined by said effective throat swage portion and the confronting portion of said lock grooves into which said collar shank is swaged and with the material of said collar shank not fully engaging said root during swage and thus not completely filling said lock grooves after swage, said collar shank being of sufficient length to provide a predetermined number of said collar shoulders engaged with a corresponding number of said pin crests, said collar shank having a through bore having a bore diameter relative to the crest diameter of said pin crests for providing a preselected clearance prior to swage whereby the relative axial force for swage is minimized.

2. The fastening system of claim 1 with said collar shank having an inner portion and an outer portion with said outer portion being located over said pull cavity, said outer portion being of a reduced wall thickness relative to said inner portion to provide swaging at a reduced swage load to assist in preventing distortion of said pin shank at said pull cavity.

3. The fastening system of claim 2 with said groove widths Wr and crest widths W along with the reduced wall thickness of said outer portion of said collar shank providing reduced overpacking and hence reduced compressive loads on said pull cavity at its outer end.

4. The fastening system of claim 3 with said overpacking varying from around 1% at the first crest and groove to around 15% at the last crest and groove.

5. The fastening system of claim 1 with said collar shank having an inner portion of a first wall thickness connected to an outer portion of reduced wall thickness selected relative to the longest width W of said crests at the outer end of said pin shank to provide swaging at a reduced swage load to assist in preventing distortion of said pin shank at said pull cavity.

6. The fastening system of claim 1 with said collar shank having an inner portion of a first wall thickness, an outer portion of a reduced wall thickness and an intermediate portion connected to said inner and outer portions of an intermediate wall thickness to provide swaging at a reduced swage load to assist in preventing distortion of said pin shank at said pull cavity.

7. The fastening system of claim 1 with the outer end of said pin shank terminating in a tapered portion inclined radially inwardly from the first crest and in radial alignment with threads at the outer end of said pull cavity.

8. The fastening system of claim 1 with the outer end of said pin shank terminating in a tapered portion inclined radially inwardly from the first crest and in radial alignment with threads at the outer end of said pull cavity, said tapered portion being in radial alignment with between around two to around four threads at the outer end of said pull cavity.

9. The fastening system of claim 1 with the outer end of said pin shank terminating in a tapered portion inclined radially inwardly from the first crest and in radial alignment with threads at the outer end of said pull cavity, said tapered portion having an axial length substantially greater than the width W of the first crest.

10. The fastening system of claim 1 with said pull cavity terminating at its inner end in a generally arcuate surface having a diameter generally that of the crest diameter of the threads of said pull cavity.

11. The fastening system of claim 1 with said pull cavity terminating at its inner end in a generally arcuate surface having a diameter generally that of the crest diameter of the threads of said pull cavity, said threaded connecting rod portion of said mandrel being of a threaded length greater than the length of the threads of said pull cavity.

12. The fastening system of claim 1 with the ratio W/Wr of crest width W to groove width Wr varying in step from around 50% at the first crest and groove to around 25% at the last crest and groove.

13. The fastening system of claim 1 with the threads of said pull cavity having roots terminating in generally flat surfaces whereby the root diameter can be minimized to enhance the compressive strength of said pull cavity.

14. The fastening system of claim 1 with the threads of said pull cavity having crests terminating in generally flat surfaces whereby the crest diameter can be increased and with the diameter of the roots of the mating threads of said connecting rod portion being increased whereby the strength of the threads of said connecting rod portion can be maximized.

15. The fastening system of claim 1 with the threads of said pull cavity having roots terminating in generally flat surfaces whereby the root diameter can be minimized to enhance the compressive strength of said pull cavity and the threads of said pull cavity having crests terminating in generally flat surfaces whereby the crest diameter can be increased and with the diameter of the roots and crests of the mating threads of said connecting rod portion being increased whereby the strength of the threads of said pull cavity and of said connecting rod portion can be maximized.

16. The fastening system of claim 15 with said pull cavity terminating at its inner end in a generally arcuate surface having a diameter generally that of the crest diameter of the threads of said pull cavity.

17. The fastening system of claim 1 with the threads of said pull cavity having roots terminating in generally flat surfaces whereby the root diameter can be minimized to enhance the compressive strength of said pull cavity and the threads of said pull cavity having crests terminating in generally flat surfaces whereby the crest diameter can be increased, the width of the flat surfaces of the crests of the threads of said pull cavity being approximately 50% longer than the width of the flat surfaces of the roots, the roots and crests of the mating threads of said connecting rod portion having flat surfaces and being of a contour matching that of the threads of the pull cavity whereby the strength of the threads of said pull cavity and of said connecting rod portion can be maximized.

18. The fastening system of claim 15 with said pull cavity terminating at its inner end in a generally arcuate surface having a diameter generally that of the crest diameter of the threads of said pull cavity, the threads of said connecting rod portion extending for a greater length than the threads of said pull cavity.

19. The fastening system of claim 1 with said mantel having a pull groove portion adapted to be releasably gripped by said installation tool for application of the relative axial force for swaging said collar into said lock grooves and for being selectively removable from said installation tool.

20. In a fastening system including a two piece fastener for securing a plurality of workpieces together and an installation tool for installing the fastener and with the fastener including a common pin member and a tubular collar selected from among at least two tubular collars of different strength materials and with each said collar having a generally straight collar shank adapted to be swaged into lock grooves on said pin member in response to a relative axial force or singe load applied between said pin member and said collar by said installation tool and providing a desired magnitude of clamp load on the workpieces in response to a predetermined magnitude of swage load, said pin member having an elongated pin shank adapted to be located in aligned openings in the workpieces and terminating at one end in an enlarged head adapted to engage a surface on one side of the workpieces and at its opposite end in a grooved portion adapted to extend past an opposite surface on the opposite side of the workpieces, said grooved portion comprising a locking portion having a plurality of said lock grooves defined by circumferentially extending pin grooves and associated pin shoulders terminating in pin crests, said pin grooves having an effective width Wr relative to the effective width W of the crests with the pitch of the crests and grooves varying from the longest at the first cast and groove at the outer end of said pin shank to the shortest at the last crest and groove, each of said pin grooves having an elongated root with a generally smooth contour, said collar shank adapted to be swaged into said lock grooves whereby the workpieces are fastened together to define the fastened joint, said collar when swaged having collar grooves and shoulders interlocking said pin grooves and shoulders, said pin shank having a treaded pull cavity at its outer end, said installation tool having an anvil member with a swage cavity having an effective throat swage portion adapted to overengage, said collar shank to thereby swage it radially inwardly into said lock grooves and being operatively connected to a mandrel having a threaded connecting rod portion adapted to be threadably engaged wit the threads of said pull cavity whereby the relative axial force can be applied between said pin and said collar by said anvil member and said mandrel to swage said collar shank into said lock grooves, said connecting rod portion being threadably disengageable from said pull cavity for removal from said pin shank upon completion of swage, the width Wr of said pin grooves being substantially uniform over said locking portion with the width W of said crests varying with the longest width W being at to outer end of said pin shank and with subsequent widths W being shorter in preselected steps, the width W of said crests in radial alignment with said pull cavity being selected to provide sufficient strength to said pin shank in the area of said pull cavity to substantially prevent collapse of said pin shank at said pull cavity from the compressive load caused by said collar shank in swage, said collar shank having a predetermined volume of material which is generally greater than the available volume defined by said effective throat swage portion and the confronting portion of said lock grooves into which said collar shank is swaged and with the material of said collar shank not fully engaging said root during swage and thus not completely filling said lock grooves after swage, said collar shank being of sufficient length to provide a predetermined number of said collar shoulders engaged with a corresponding number of said pin crests, said collar shank having a through bore having a bore diameter relative to the crest diameter of said pin crests for providing a preselected clearance prior to swage whereby the relative axial force for swage is minimized, said pin having a common construction adapted to secure workpieces in different applications in which the tensile load on said fastener as applied by the workpieces can vary from a high tensile load to a reduced tensile load, a first one of said collars being made of a high strength material for the high tensile load application and a second one of said collars being made of lower strength material for the reduced tensile load application, said pin member being of a higher strength material than said first one of said collars, the width W of said crests being selected for the high tensile load application wit said collar of the high strength material.

21. The fastening system of claim 20 with said collar shank having an inner portion and an outer portion with said outer portion being located over said pull cavity, said outer portion being of g reduced wall thickness relative to said inner portion to provide swaging at a reduced swage load to assist in preventing distortion of said pin shank at said pull cavity.

22. The fastening system of claim 21 with said groove widths Wr and crest widths W along with the reduced wall thickness of said outer portion of said collar shank providing reduced overpacking and hence reduced compressive loads on said pull cavity at its outer end.

23. The fastening system of claim 22 with said overpacking varying from around 1% at the first crest and groove to around 15% at the last crest and groove.

24. The fastening system of claim 20 with said collar shank having an inner portion of a first wall thickness connected to an outer portion of reduced wall thickness selected relative to the longest width W of said crests at the outer end of said pin shank to provide swaging at a reduced swage load to assist in preventing distortion of said pin shank at said pull cavity.

25. The fastening system of claim 20 with said collar shank having an inner portion of a first wall thickness, an outer portion of a reduced wall thickness and an intermediate portion connected to said inner and outer portions of an intermediate wall thickness to provide swaging at a reduced swage load to assist in preventing distortion of said pin shank at said pull cavity.

26. The fastening system of claim 20 with said mandrel having a pull groove portion adapted to be releasably gripped by said installation tool for application of the relative axial force for swaging said collar into said lock grooves and for being selectively removable from said installation tool.

* * * * *